US012344771B2

(12) United States Patent
Binder et al.

(10) Patent No.: US 12,344,771 B2
(45) Date of Patent: Jul. 1, 2025

(54) TACKIFIER COMPOSITION

(71) Applicants: Dow Global Technologies LLC, Midland, MI (US); Rohm and Haas Company, Collegeville, PA (US)

(72) Inventors: Joseph B. Binder, Haverford, PA (US); Saswati Pujari, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 809 days.

(21) Appl. No.: 17/435,641

(22) PCT Filed: Jan. 31, 2020

(86) PCT No.: PCT/US2020/016160
§ 371 (c)(1),
(2) Date: Sep. 1, 2021

(87) PCT Pub. No.: WO2020/180435
PCT Pub. Date: Sep. 10, 2020

(65) Prior Publication Data
US 2022/0154047 A1    May 19, 2022

Related U.S. Application Data

(60) Provisional application No. 62/812,417, filed on Mar. 1, 2019.

(51) Int. Cl.
| | |
|---|---|
| C09J 11/08 | (2006.01) |
| C08F 212/08 | (2006.01) |
| C08F 220/18 | (2006.01) |
| C09J 7/38 | (2018.01) |

(52) U.S. Cl.
CPC ............ *C09J 11/08* (2013.01); *C08F 212/08* (2013.01); *C08F 220/1804* (2020.02); *C09J 7/385* (2018.01); *C08F 2800/20* (2013.01); *C09J 2301/408* (2020.08); *C09J 2301/414* (2020.08); *C09J 2425/00* (2013.01); *C09J 2433/00* (2013.01)

(58) Field of Classification Search
CPC .............................. C09J 11/08; C09J 2301/408
See application file for complete search history.

(56) References Cited

U.S. PATENT DOCUMENTS

| | | | |
|---|---|---|---|
| 4,912,169 | A | 3/1990 | Whitmire et al. |
| 4,968,740 | A | 11/1990 | Makati et al. |
| 5,028,484 | A | 7/1991 | Martin et al. |
| 5,236,991 | A | 8/1993 | Makati et al. |
| 5,492,950 | A | 2/1996 | Brown et al. |
| 6,927,267 | B1 | 8/2005 | Varela de la Rosa et al. |
| 6,989,413 | B2 | 1/2006 | Hazen et al. |
| 7,262,242 | B2 | 8/2007 | Gielens et al. |
| 9,605,188 | B2 | 3/2017 | Gerst et al. |
| 9,657,204 | B2 | 5/2017 | Gerst et al. |
| 9,890,301 | B2 | 2/2018 | Qie et al. |
| 2002/0055587 | A1 | 5/2002 | Lau et al. |
| 2005/0182150 | A1 | 8/2005 | Bamborough et al. |
| 2018/0086867 | A1 | 3/2018 | Einsla et al. |
| 2019/0390091 | A1 | 12/2019 | Gerst et al. |

FOREIGN PATENT DOCUMENTS

| | | |
|---|---|---|
| CA | 2026662 A1 | 3/1992 |
| CN | 1429259 | 7/2003 |
| CN | 102390590 A | 3/2012 |
| CN | 104342073 A | 2/2015 |
| CN | 106256838 A | 12/2016 |
| CN | 104093807 B | 9/2017 |
| EP | 0312228 A1 | 4/1989 |
| EP | 2847290 | 9/2015 |
| IN | 360096 B | 3/2021 |
| JP | 2014-005387 A | 1/2014 |
| WO | 2013/117428 A1 | 8/2013 |
| WO | 2018/141489 A1 | 8/2018 |

OTHER PUBLICATIONS

PCT/US2020/016160, International Search Report and Written Opinion with a mailing date of Apr. 20, 2020.
Wan Xiaoting, "Study on the Synthesis and Properties of Self-Crosslinking Core-Shell Structure Acrylic/VeoVa 10/Vac Copolymer Emulsion" Wuhan Institute of Technology, Mar. 30, 2016.
Kim Dae-Jun "Effect of Substrate and Tackifier on Peel Strength of SIS (Styrene-Isoprene-Styrene)-Based HMPSAs" International Journal of Adhesion & Adhesives, Oct. 4, 2004, p. 288-295, vol. 25.

*Primary Examiner* — Vickey Nerangis
(74) *Attorney, Agent, or Firm* — Boyle Fredrickson S.C.

(57) ABSTRACT

A tackifier polymeric additive including an emulsion polymerization reaction product of: (a) at least one aromatic monomer; (b) at least one acrylate or methacrylate monomer; and (c) at least one chain transfer agent; and a tackified acrylic adhesive composition including (I) at least one acrylic adhesive polymer; and (II) the above tackifier polymeric additive.

12 Claims, No Drawings

TACKIFIER COMPOSITION

FIELD

The present invention relates to a tackifier polymeric additive; and more particularly, the present invention relates to a tackifier polymeric additive for adhesives.

BACKGROUND

Pressure sensitive adhesives are characterized both by the adhesives' adhesion to substrates (peel, tack) and the adhesives' internal cohesive strength (shear resistance). However, adhesion and cohesive strength are two properties that are usually inversely related. For certain applications improvements are needed in both adhesion and cohesion; and these two properties are difficult to obtain by conventional polymer design or additive methods.

One common method to increase the adhesion of a pressure sensitive adhesive is to add a polymeric additive, called a tackifier, to the adhesive. The tackifier functions to increase the autoadhesion (tack) of the adhesive. Several classes of polymers have been known to be used as tackifiers such as rosins and rosin derivatives, terpene resins, and hydrocarbon resins. Nonetheless, these known tackifiers suffer from several problems, including for example, a poor compatibility with acrylic adhesive polymers, an undesirable color, and a significant decrease in the cohesive strength of a formulated adhesive with such tackifiers. Also, currently the above known tackifiers are not readily available.

An alternative approach of providing a tackifier for adhesives is to make a tackifier polymer from vinyl aromatic or (meth)acrylic monomers. For instance, U.S. Pat. No. 4,912,169 describes adhesive polymers which are tackified with polymeric additives wherein the polymeric additives have been polymerized from $C_1$-$C_{20}$ alkyl and cycloalkyl (meth)acrylates, olefinic acids, and other ethylenically unsaturated monomers; and wherein the polymeric additives have a number average molecular weight (Mn) of less than (<) 35,000 and a softening point of greater than (>) 40 degrees Celsius (° C.). These manufactured tackifier polymers address the problems with the undesirable color and the availability of various resins. However, formulated adhesives using the manufactured tackifier polymers still suffer from a significant decrease in the cohesive strength. In addition, several of the raw materials useful to make the polymeric additives, such as isobutyl methacrylate (IBMA) and isobornyl methacrylate (IBOMA), are difficult to obtain.

Several prior art references disclose the use of a tackifier material in various polymer compounds including, for example, U.S. Pat. Nos. 4,912,169; 5,028,484; 5,236,991; 6,989,413; 7,262,242; 7,723,466; 7,332,540; 9,605,188; and 9,657,204; and U.S. Patent Application Publication No. US20020055587; CN1429259; WO2016160250; and EP2847290. The above references, however, do not disclose a tackifier material which combines the following qualities: (1) compatibility with the adhesive polymer; (2) sufficiently high glass transition temperature (Tg) (e.g. >0° C.) so as not to substantially decrease shear; and (3) increasing the adhesion (peel or tack) of the adhesive when formulated. In some of the known adhesive compositions, the adhesion of the adhesive drops to an undesirable low level such that the adhesion is lower than that of the adhesive without the tackifier material.

Therefore, there remains a need in the adhesive industry for a tackifier material that: (1) can be produced using readily available raw materials, (2) can be prepared using standard emulsion polymerization equipment instead of specialized equipment; (3) has good compatibility with acrylic adhesive polymers; (4) can increase the peel and tack adhesion properties of an adhesive; and (5) does not substantially decrease the shear resistance property of the adhesive.

SUMMARY

In one general embodiment, the present invention is directed to a tackifier polymeric additive including an emulsion polymerization reaction product of: (a) at least one styrene, methyl methacrylate, alpha-methyl styrene, or other aromatic monomer with a homopolymer Tg of >80° C.; (b) at least one acrylate or methacrylate monomer; and (c) at least one chain transfer agent (CTA). The tackifier polymeric additive exhibits several beneficial properties, for example, the Tg of the tackifier polymeric additive can be >0° C., the Mn of the tackifier polymeric additive can be from 1,200 Daltons (Da) to 20,000 Da, and the polymer miscibility score of the tackifier polymeric additive can be >0. The selection of monomers, Tg, Mn, and polymer miscibility score, significantly differentiates the tackifier polymeric additives of the present invention from known additives.

In addition, the tackifier polymeric additives made according to the present invention criteria described herein, unexpectedly increase the adhesion property of an adhesive composition without substantially decreasing the shear resistance property of the adhesive composition; and the tackifier polymeric additives of the present invention have good compatibility with acrylic adhesive polymers. Further, the raw materials used to prepare the tackifier polymeric additives of the present invention are readily available materials.

In another general embodiment, the present invention is directed to a tackified acrylic adhesive composition comprised of (I) at least one acrylic adhesive polymer and (II) at least one of the tackifier polymer additives described above. Advantageously, the adhesion of the tackified adhesive composition of the present invention can be increased without substantially decreasing the cohesion (shear resistance) of the tackified adhesive composition of the present invention.

DETAILED DESCRIPTION

"Adhesion" herein means pressure sensitive adhesive peel adhesion test or loop tack test as measured by PSTC 101 or PSTC 16.

"Cohesion" or "shear resistance" herein means pressure sensitive adhesive shear resistance testing as measured by PSTC 107.

"Polymer miscibility score", with reference to a tackifier polymeric additive, herein means a calculated measure of the miscibility of the tackifier polymeric additive with an acrylic adhesive polymer based on the monomer composition of the tackifier polymeric additive, the Mn of the tackifier polymeric additive, and, optionally, the monomer composition of the acrylic adhesive polymer.

In a broad embodiment, the present invention includes a tackifier polymeric additive which is an emulsion polymerized reaction product of: (a) at least one monomer such as styrene, methyl methacrylate, alpha-methyl styrene, or other aromatic monomer with a homopolymer Tg of >80° C.; (b) at least one acrylate or methacrylate monomer; and (c) at least one chain transfer agent; such that the glass transition temperature (Tg) of the tackifier polymeric additive is >0°

C., the Mn of the tackifier polymeric additive is from 1,200 Da to 20,000 Da, and the polymer miscibility score of the tackifier polymeric additive is >0.

Component (a) of the present invention tackifier polymeric additive includes, for example, at least one monomer with a homopolymer Tg of >80° C. The Tg of the homopolymer of the monomer can be measured by using the midpoint temperature using differential scanning calorimetry (DSC) as described in, for example, ASTM 3418/82.

In some embodiments, the monomer with a homopolymer Tg>80° C. may be an aromatic monomer known in the art capable of polymerizing with at least one acrylate or methacrylate monomer to produce the tackifier resin. The term "aromatic monomer" means a monomer containing at least one group of unsaturated cyclic hydrocarbons containing one or more rings. Examples of aromatic monomers useful in the present invention include, but are not limited to, olefinic substituted aromatics, such as, styrene, alpha-methyl styrene, vinyl toluene, indene, methylindene, divinylbenzene, dicyclopentadiene, methyl-dicyclopentadiene, and mixtures thereof. In one preferred embodiment, the aromatic monomer can be styrene. In other embodiments, the monomer with a homopolymer Tg>80° C. may be methyl methacrylate. In still other embodiments, two or more monomers with homopolymer Tg>80° C. may be used in combination.

In general, the homopolymer Tg of the monomer can be >80° C. in in one embodiment, from 80° C. to 110° C. in another embodiment and from 95° C. to 160° C. in still another embodiment.

The amount of monomer with a homopolymer Tg>80° C. used to make the tackifier polymeric additive can be, for example, from 80 weight percent (wt %) to 10 wt % in one embodiment, from 75 wt % to 20 wt % in another embodiment and from 75 wt % to 30 wt % in still another embodiment. Above and below the above amount ranges, the tackifier polymeric additive would not meet the compatibility and Tg requirements of the present invention.

Component (b) of the present invention tackifier polymeric additive includes, for example, at least one acrylate or methacrylate monomer known in the art capable of polymerizing with the monomer with a homopolymer Tg>80° C.

In one embodiment, the acrylate monomer can be a monomer having the following general Formula (I):

  Formula (I)

$$R1-CH=CR2-COOR3$$

wherein R1 is selected from the group consisting of hydrogen, aliphatic groups, and aromatic groups; wherein R2 is selected from the group consisting of hydrogen, aliphatic groups, and aromatic groups; and wherein R3 is selected from the group consisting of hydrogen, aliphatic groups, aromatic groups.

The term "aliphatic" is defined as a straight or branched chain arrangement of constituent carbon atoms and includes, but is not limited to, alkanes, alkenes, alkadienes, and alkynes. The aliphatic groups can contain functional groups, such as, but not limited to, hydroxyl, cycloaliphatic, acid, epoxide, amide, acrylonitrile and acrylate. In one preferred embodiment, the aliphatic group can have from 1 carbon atom to 20 carbon atoms, and from 1 carbon atom to 12 carbon atoms in another embodiment.

The term "aromatic group" means at least one group of unsaturated cyclic hydrocarbons containing one or more rings. Aromatic groups can be selected from the group consisting of both unsubstituted and substituted aromatic groups having constituents with up to 6 carbon atoms. In one preferred embodiment, the aromatic group can have from 6 carbon atoms to 20 carbon atoms. The aromatic groups can contain functional groups, such as, but not limited to, hydroxyl, cycloaliphatic, acid, epoxide, amide, acrylonitrile and acrylate. In some embodiments, the above functional groups can lead to an acrylate monomer that has more than one reactive site for polymerization or other reactions. In one preferred embodiment, both R1 and R2 of the acrylate monomer of Formula (I) are hydrogen. When the acrylate monomer is a methacrylic compound, R2 is a $CH_3$ group.

In other embodiments, for acid functionality monomers, R3 of Formula (I) can be hydrogen, forming a monomer such as, acrylic acid and methacrylic acid. The acid functionality monomers can also include difunctional components such as, for example, maleic acid, and fumaric acid. And, in still other embodiments the acid functionality monomers can include the anhydride forms of the above components.

In still another embodiment, the functional group can be found in the R3 group of Formula (I). Suitable examples useful in the present invention can include hydroxyethylacrylate, glycidylmethacrylate, and 1,3-butanediol dimethylacrylate.

Exemplary of suitable acrylate or methacrylate monomers useful in the present invention can include esters of mono-ethylenically unsaturated carboxylic acids having 3 carbon atoms to 24 carbon atoms, in particular esters of acrylic and methacrylic acid, including methyl acrylate ("MA"), ethyl acrylate ("EA"), butyl acrylate ("BA"), butyl methacrylate, isobutyl acrylate, isobutyl methacrylate, isoamyl acrylate, isoamyl methacrylate, 2-ethylhexyl methacrylate, isooctyl acrylate, isooctyl methacrylate, n-propyl acrylate, isopropyl acrylate, methyl methacrylate ("MMA"), decyl acrylate, decyl methacrylate, dodecyl acrylate, dodecyl methacrylate, and mixtures thereof.

$\alpha,\beta$-Monoethylenically unsaturated mono- or dicarboxylic acids of 3 carbon atoms to 6 carbon atoms, such as acrylic acid ("AA"), methacrylic acid, itaconic acid, fumaric acid, maleic acid, and mixtures thereof; and the anhydrides of mono-olefinically unsaturated dicarboxylic acids, such as maleic anhydride, itaconic anhydride, and mixtures thereof are also suitable for use in the present invention.

Other tackifier polymeric additives useful in the present invention can include other monomers including hydroxyalkyl acrylates and methacrylates, such as 2-hydroxyethyl acrylate, 2-hydroxyethyl methacrylate, 4-hydroxybutyl acrylate, 4-hydroxybutyl methacrylate, and mixtures thereof.

In some preferred embodiments, acrylate or methacrylate monomers can include n-butyl acrylate, t-butyl acrylate, ethyl acrylate, 2-ethylhexyl acrylate, n-butyl methacrylate, i-butyl methacrylate, s-butyl methacrylate, t-butyl methacrylate, and mixtures thereof. In still other embodiments, two or more acrylate or methacrylate monomers may be used in combination.

The amount of acrylate or methacrylate monomer used to make the tackifier polymeric additive can be, for example, from 90 wt % to 20 wt % in one embodiment, from 80 wt % to 25 wt % in another embodiment and from 70 wt % to 25 wt % in still another embodiment. Above and below the above amount ranges, it would be difficult to achieve the Tg and compatibility properties of the tackifier polymeric additive of the present invention The acrylate or methacrylate monomer, component (b), exhibits some advantageous properties per se before it is used to make the tackifier polymeric additive. For example, the monomers with acid functionality described above may improve the stability of the polymer in the end use application. Monomers with more than one reactive site could allow for branching or crosslinking reactions.

Component (c) of the present invention tackifier polymeric additive includes, for example, at least one CTA. Exemplary of the chain transfer agents which may be used in the present invention include long chain alkyl mercaptans such as t-dodecyl mercaptan and n-dodecyl mercaptan (n-DDM), 3-mercaptopropionic acid and its esters such as methyl 3-mercaptopropionate (MMP) and butyl 3-mercaptopropionate, carbon tetrachloride, tetrachloroethylene and trichloro-bromoethane; and mixtures thereof.

In some embodiments, the chain transfer agent may be a dithioester or trithioester known to act as a chain transfer agent in free radical polymerization. Exemplary of the chain transfer agents which may be used in the present invention include 2-(dodecylthiocarbono-thioylthio)-2-methylpropionic acid, poly(ethylene glycol) methyl ether (4-cyano-4-pentanoate dodecyl trithiocarbonate), 2-cyano-2-propyl dodecyl trithiocarbonate, 2-cyano-2-propyl dodecyl trithiocarbonate, 4-cyano-4-(phenylcarbonothioylthio)pentanoic acid, 2-phenyl-2-propyl benzodithioate, 2-cyano-2-propyl benzodithioate, and mixtures thereof.

The amount of chain transfer agent used to make the tackifier polymeric additive can be, for example, an amount chosen to achieve the targeted Mn of the tackifier polymeric additive, e.g. from 1,200 Da to 20,000 Da according to the following relationship:

$$N_{CTA} = \frac{N_{monomer} \times \Sigma_i z_i \chi_i}{Mn - z_{CTA}}$$

where $N_{CTA}$ is the number of moles of CTA, $N_{monomer}$ is the number of moles of monomer, $z_i$ is the molecular weight of the i-th monomer, $\chi_i$ is the mole fraction of the i-th monomer, Mn is the targeted Mn of the tackifier polymeric additive, and $z_{CTA}$ is the molecular weight of the CTA. Depending upon the CTA and monomers selected, the moles of CTA per moles of monomer may be selected to achieve the targeted Mn.

The amount of chain transfer agent used to make the tackifier polymeric additive can be dependent on the specific CTA used to make the additive and the amounts of the other components in the additive. However, as an illustrative embodiment, and not to be limited thereby, when the CTA used in the present invention is, for example, n-DDM, the amount of chain transfer agent can be from 1 wt % to 17 wt %; or when the CTA used in the present invention is, for example, MMP, the amount of chain transfer agent can be from 0.6 wt % to 10 wt %.

The CTA, component (c), exhibits some advantageous properties per se before the CTA is used to make the tackifier polymeric additive. For example, the properties of the CTA can include solubility in water such that it can transport from the through the aqueous phase to the growing polymer particle in emulsion polymerization or such that it primarily acts upon polymerization in the aqueous phase. Other chain transfer agents may have lower water solubility and greater solubility in organic solvents such that they primarily act upon polymerization in the monomer-swollen polymer particles. Still other chain transfer agents may support reversible transfer reactions to enable reversible addition—fragmentation chain transfer (RAFT) polymerization.

In other embodiments, the present invention tackifier polymeric additive can include, for example, at least one or more additional optional components, compounds or agents.

In one embodiment, an additional component (d) useful in the present invention may include, for example water.

The amount of water when used to make the tackifier polymeric additive can be, for example, from 25 wt % to 80 wt % in one embodiment, from 30 wt % to 75 wt % in another embodiment and from 30 wt % to 60 wt % in still another embodiment. In another embodiment, the one or more optional surfactants can be added to the tackifier polymeric additive. Exemplary of suitable surfactants for use according the present invention can include, but are not limited to, cationic surfactants; anionic surfactants; zwitterionic surfactants; non-ionic surfactants; and combinations thereof. Examples of cationic surfactants useful in the present invention can include, but are not limited to, quaternary amines; lauryl-pyridinium chlorides;

cetyldimethyl amine acetate; alkyldimethyl-benzylammonium chlorides in which the alkyl group has from 8 carbon atoms to 18 carbon atoms; and mixtures thereof. Examples of anionic surfactants useful in the present invention can include, but are not limited to, sulfonates; carboxylates; phosphates; and mixtures thereof. Examples of non-ionic surfactants useful in the present invention can include, but are not limited to, block copolymers containing ethylene oxide and silicone surfactants, such as ethoxylated linear and branched aliphatic alcohols; ethoxylated fatty acids; sorbitan derivatives; lanolin derivatives; alkoxylated polysiloxanes; and mixtures thereof.

The amount of any optional surfactant when used to make the tackifier polymeric additive can be, for example, from 0 wt % to 5 wt % in one embodiment, from 0.01 wt % to 3 wt % in another embodiment and from 0.1 wt % to 2 wt % in still another embodiment.

In other embodiments, the present invention tackifier polymeric additive can include, for example, at least one or more initiators. Exemplary of the initiator useful in the present invention can include thermal initiators; redox system initiators; or mixtures thereof. Examples of thermal initiators useful in the present invention can include, but are not limited to, sodium persulfate; ammonium persulfate; and mixtures thereof. When the initiator used in the present invention is a redox system initiator, a reducing agent used can be, for example, an ascorbic acid; a sulfoxylate; or an erythorbic acid; while the oxidation agent used can be, for example, a peroxide; or a persulfate. Generally, the amount of initiator used can be >1 weight percent in one embodiment, based on the total weight of the monomers in the monomer mixture.

In general, the process for making tackifier polymeric additive includes copolymerization of (a) at least one monomer with a homopolymer Tg of >80° C. and (b) at least one acrylate or methacrylate monomer; in the presence of (c) at least one chain transfer agent; and any desirable optional compounds, additives or agents.

In a preferred embodiment, the tackifier polymeric additive can be prepared by an emulsion polymerization method. The parameters of the emulsion polymerization may be adjusted by those skilled in the art of emulsion polymerization. For example, one or more of the monomers and chain transfer agent may be emulsified in the aqueous phase prior to emulsion polymerization. The polymerization may be started with new particles formed from the polymerization of the monomers or in the presence of a previously prepared seed polymer. The initiator may be added at the beginning of the polymerization or according to a feeding schedule. In another preferred embodiment the tackifier polymeric additive may be prepared by a semi-batch emulsion polymerization method in which the mixture of monomers is fed gradually to the polymerization reactor.

The tackifier polymeric additive of the present invention has several beneficial properties and performances including, for example, a high Tg, a high Mn, and a high polymer miscibility score.

For example, the Tg of the tackifier polymeric additive can be >0° C. in one embodiment; from 0° C. to 50° C. in another embodiment, from 10° C. to 50° C. in still another embodiment; and from 15° C. to 40° C. in yet another embodiment. The Tg of the tackifier polymeric additive can be measured by the midpoint temperature using a differential scanning calorimetry (DSC) curve as described in, for example, ASTM 3418/82. If the Tg of the tackifier polymeric additive is <0° C., it is likely that the shear of the adhesive formulated from the tackifier polymeric additive and an acrylic adhesive will be <70 hours (hr).

For example, the Mn of the tackifier polymeric additive can be from 1,200 Da to 20,000 Da in one embodiment; from 1,500 Da to 15,000 Da in another embodiment, from 1,800 Da to 10,000 Da in still another embodiment; and from 2,500 Da to 10,000 Da in yet another embodiment. As the molecular weight of the tackifier polymeric additive becomes higher, the compatibility and adhesion of the tackifier polymeric additive can become lower. As molecular weight of the tackifier polymeric additive becomes lower, the Tg of the additive can become lower and the cohesive strength of the final adhesive film tends to be lower. The Mn of the tackifier polymeric additive can be measured by a size exclusion chromatography-like Gel Permeation Chromatography (GPC).

Most emulsion polymeric additives comprised of styrene and methyl methacrylate do not act as tackifiers (do not increase adhesion). However, in the present invention, by selecting the additives based on the polymer miscibility score excellent tackifiers may be obtained. More specifically, the polymer miscibility score of the tackifier polymeric additive of the present invention can be calculated using the following Equation (I):

$$7.14 \times \left(0.01 + \left(\frac{1}{\sqrt{D_p}}\right)\right)^2 - \frac{V}{RT} \times \left((\delta_{D1} - \delta_{D2})^2 + \frac{(\delta_{P1} - \delta_{P2})^2}{4} + \frac{(\delta_{H1} - \delta_{H1})^2}{4}\right) \quad \text{Equation (I)}$$

where V is chosen to be 100 cm³/mol; R is the universal gas constant; T is chosen to be 298 K; $\delta_{D1}$, $\delta_{P1}$, and $\delta_{H1}$ are the HSP (Hansen Solubility Parameters) for the tackifier additive polymer; $\delta_{D2}$, $\delta_{P2}$, and $\delta_{H2}$ are the HSP for the acrylic adhesive polymer to be blended with the tackifier additive polymer; and $D_p$ is the mean degree of polymerization of the tackifier additive polymer. $\delta_{D2}$, $\delta_{P2}$, and $\delta_{H2}$ may be selected for a particular acrylic adhesive polymer to be blended with the tackifier polymeric additive in some embodiments. In other embodiments generic HSP for typical acrylic adhesive polymers may be selected such that $\delta_{D2}=15.2$, $\delta_{P2}=5.4$, and $\delta_{H2}=4.2$.

For the purposes of the calculation of the polymer miscibility score of the tackifier polymeric additive, the $D_p$ is calculated using the following Equation (II):

$$\left(\frac{Mn}{\Sigma_i z_i x_i}\right) \quad \text{Equation (II)}$$

where $z_i$ is the molecular weight of the i-th monomer, $x_i$ is the mass fraction of the i-th monomer, and Mn is the Mn of the tackifier polymeric additive.

The polymer HSP for either the tackifier polymeric additive or the acrylic adhesive polymer can be calculated by linear combination of the HSP for each component monomer weighted by weight fraction, using HSP data contained, for example, in Hansen, C. M.; *Hansen Solubility Parameters: A User's Handbook*, $2^{nd}$ Ed.: 2007, CRC Press, Boca Raton. The polymer HSP for a polymer prepared from 82.4 wt % EHA, 16.6 wt % MMA, and 1 wt % AA are $\delta_D=15.0$, $\delta_P=5.0$, and $\delta_H=3.8$ (J/cm³)$^{1/2}$, respectively, derived from the following monomer HSPs:

TABLE I

Examples of Monomer HSPs in (J/cm³)$^{1/2}$

| Monomer | $\delta_D$ | $\delta_P$ | $\delta_H$ |
|---|---|---|---|
| 2-Ethyl hexyl Acrylate (EHA) | 14.8 | 4.7 | 3.4 |
| Methyl Methacrylate (MMA) | 15.8 | 6.5 | 5.4 |
| Vinyl Acetate (VA) | 16 | 7.2 | 5.9 |
| Styrene (Sty) | 18.6 | 1 | 4.1 |
| Ethyl Acrylate (EA) | 15.5 | 7.1 | 5.5 |
| Butyl Acrylate (BA) | 15.6 | 6.2 | 4.9 |
| Acrylic Acid (AA) | 17.7 | 6.4 | 14.9 |
| Methyl Acrylate (MA) | 15.3 | 6.7 | 9.4 |
| Hydropropyl Acrylate (HPA) | 16 | 13.2 | 13.4 |

In the case that the HSP for a monomer is not available, the HSP may be estimated by group contribution methods from related monomers and group contribution terms. According to the group contribution method described in Hansen, C. M.; *Hansen Solubility Parameters: A User's Handbook*, $2^{nd}$ Ed.: 2007, CRC Press, Boca Raton, the HSP term may be estimated as a sum of the contributions from different groups in the monomer using the following Equation (III):

$$\delta = \sqrt{\frac{\Sigma U}{\Sigma V}} \quad \text{Equation (III)}$$

where in Equation (III) $\delta$ may be any of the three components of the HSP, U is the group contribution for each different part of the monomer for the selected component of the HSP, and V is the volume contribution for each different part of the monomer. For example, the HSP for sodium vinyl sulfonate (SVS) may be estimated from those for methyl vinyl sulfone and group contribution terms from the literature. Methyl vinyl sulfone has the structure $H_2C=CH-S(=O)_2Me$ and SVS has the structure $H_2C=CH-S(=O)_2ONa$; and therefore, the HSP for SVS can be estimated by taking the group contributions for methyl vinyl sulfone, subtracting those for the methyl group, adding those for a hydroxyl group, and making an adjustment for the conversion of the hydroxyl group to a sodium salt. The data for methyl vinyl sulfone, the methyl group, and the hydroxyl group can be taken from Hansen, C. M.; *Hansen Solubility Parameters: A User's Handbook*, $2^{nd}$ Ed.: 2007, CRC Press, Boca Raton, while the data for the sodium salt adjustment can be taken from Barra, J.; Peña, M.-A.; Bustamante, P. *Eur. J. Pharm. Sci.* 2000, 10, 153-161.

TABLE II

| | Estimation of HSP for SVS $(J/cm^3)^{1/2}$ | | | | | | |
|---|---|---|---|---|---|---|---|
| | V (cm³/mol) | $\delta_D$ $(J/cm^3)^{1/2}$ | $\delta_P$ $(J/cm^3)^{1/2}$ | $\delta_H$ $(J/cm^3)^{1/2}$ | $U_D$ (cal/mol) | $U_P$ (cal/mol) | $U_H$ (cal/mol) |
| Methyl vinyl sulfone | 87.6 | 16.8 | 19.6 | 4.8 | | | |
| Calculated from HSP and volume | | | | | 5,909 | 8,043 | 482 |
| Methyl group | 33.5 | | | | 1,180 | 0 | 0 |
| Hydroxyl group | 10 | | | | 1,770 | 700 | 4,650 |
| Sodium salt adjustment | 9.2 | | | | 986 | 2,033 | 2,941 |
| SVS | 73.3 | 20.7 | 24.8 | 21.5 | | | |

As an illustration, $\delta_H$ for SVS can be calculated using the following Equation (IV):

$$\delta_H = \sqrt{\left(\frac{482 - 0 + 4650 + 2941}{73.3}\right) \times 4.184 \text{ J/cal}} = 21.5 \text{ } (J/cm^3)^{1/2} \qquad \text{Equation (IV)}$$

It will be readily apparent to those of ordinary skill in the art how to use the above group contribution methods to calculate HSP for other monomers. Moreover, HSP may also be calculated from experimental data for the monomer in question using methods described in, for example, Hansen, C. M.; *Hansen Solubility Parameters: A User's Handbook*, 2nd Ed.: 2007, CRC Press, Boca Raton.

For example, the polymer miscibility score of the tackifier polymeric additive, as calculated using Equation (I) above, can be >0 in one embodiment; from 0 to 3 in another embodiment, from 0 to 1 in still another embodiment; and from 0.05 to 0.9 in yet another embodiment. If the polymer miscibility score of the tackifier polymeric additive is less than 0, it is likely that the adhesion of the adhesive formulated from the tackifier polymeric additive and an acrylic adhesive will be no greater than that of the unformulated acrylic adhesive.

In another broad embodiment, the present invention includes a tackified adhesive composition which is an admixture of: (I) at least one adhesive polymer and (II) at least one of the tackifier polymer additives described above. The tackified adhesive compositions of the present invention can be distinguished from tackified compositions disclosed in the prior art by the increase in adhesion without substantial decrease in cohesion (shear resistance) of the tackified adhesive compositions of the present invention compared to the tackified compositions disclosed in the prior art without the tackifier polymer additive of the present invention.

The adhesive polymer, component (I), of the present invention includes, for example, rubbers such as isoprene and acrylonitrile-butadiene-styrene and polymers or copolymers prepared from styrene, butadiene, ethylene, vinyl acetate, acrylic acid and esters thereof, and methacrylic acid and esters thereof. In a preferred embodiment the adhesive polymer is a pressure sensitive adhesive polymer which is a polymer or copolymer of styrene, butadiene, ethylene, vinyl acetate, acrylic acid and esters thereof, and methacrylic acid and esters thereof.

The amount of acrylic adhesive polymer, component (I), used to make the tackified acrylic adhesive composition can be, for example, from 45 wt % to 99 wt % in one embodiment, from 60 wt % to 95 wt % in another embodiment and from 50 wt % to 90 wt % in still another embodiment.

The tackifier polymer additive, component (II), of the present includes, one or more of the tackifier polymer additives described above.

The amount of tackifier polymer additive, component (II) mixed with the acrylic adhesive polymer, component (I), to make the tackified acrylic adhesive composition can be, for example, from 1 wt % to 55 wt % in one embodiment, from 5 wt % to 40 wt % in another embodiment and from 10 wt % to 50 wt % in still another embodiment.

To make the tackified acrylic adhesive composition of the present invention, optional compounds, agents and additives can be added to the composition as component (IV). Such optional components (IV) may include, for example, plasticizers, crosslinkers, multi-valent metal ion salts, defoamers, thickeners, rheology modifiers, stabilizers, pigments, wetting agents, and mixtures thereof. Moreover, other classes of tackifiers may be added in addition to the tackifier polymeric additive as well.

In general, the process for making the tackified acrylic adhesive composition includes admixing: (I) at least one acrylic adhesive polymer; and (II) at least one tackifier polymer additive described above. To this admixture, any optional component(s) can be added as desired.

The tackified acrylic adhesive composition of the present invention has several beneficial properties and performances including, for example, an increase in adhesion; no substantial decrease in cohesion (shear resistance); and enhanced low surface energy adhesion, for example, adhesion to materials with nonpolar surfaces such as polyethylene including HDPE (high density polyethylene), polypropylene and other polyolefin films. In some embodiments, the low surface energy surface has a surface energy of no greater than 35 millinewtons per meter (mN/m).

The tackified acrylic adhesive composition increases the adhesion property (peel) such that the peel of the tackified composition is greater than that of the untackified adhesive polymer, or at least >90 percent (%) of the peel of the untackified adhesive polymer. For example, the adhesion property (peel) of the tackified acrylic adhesive composition relative to the peel of the untackified adhesive polymer can be from 90% to 1,000% in one embodiment; from 100% to 500% in another embodiment, from 120% to 500% in still another embodiment; and from 150% to 400% in yet another embodiment. The adhesion property of the tackified acrylic adhesive composition can be measured by an Instron as per PSTC 101 standard peel adhesion measurement.

For example, the cohesion (shear resistance) property of the tackified acrylic adhesive composition can be >70 hr in one embodiment; from 71 hr to >500 hr in another embodiment, from 78 hr to >200 hr in still another embodiment; and from 100 hr to >200 hr in yet another embodiment. The cohesion (shear resistance) property of the tackified acrylic adhesive composition can be measured by PSTC 107.

The tackified acrylic adhesive composition of the present invention may be used in various applications such as for example, any pressure sensitive label adhesive including paper label, pressure sensitive tapes, over-lamination films, and the like. In a preferred embodiment, the tackified acrylic adhesive composition can be used, for example, for pressure sensitive paper label applications.

EXAMPLES

The following examples are presented to further illustrate the present invention in detail but are not to be construed as limiting the scope of the claims. Unless otherwise indicated, all parts and percentages are by weight.

Various raw materials or ingredients used in the Inventive Examples (Inv. Ex.) and the Comparative Examples (Comp. Ex.) are explained as follows:

Triton XN-45S is a surfactant available from The Dow Chemical Company.

Various terms and designations used in the Examples are explained as follows:

"Sty" stands for styrene.
"MAA" stands for methacrylic acid.
"nDDM" stands for n-dodecylmercaptan.
"BMA" stands for n-butyl methacrylate.
"MMA" stands for methyl methacrylate.

Examples 1-4 and Comparative Examples
A-C—Tackifier Polymeric Additives

General Procedure for Preparing Emulsions

Using a flask equipped with a mechanical stirrer, a charge composed of 0.6 g sodium carbonate, 720 grams (g) of deionized water, 7.2 g of a 22% strength solution of sodium dodecylbenzene sulfonate in water, and 13.2 g of methyl beta-cyclodextrin was warmed to 87° C. An emulsion made up of 11.2 g of Triton XN-45S, 13.4 g of a 22% strength solution of sodium dodecylbenzene sulfonate in water, 3.3 g of methacrylic acid, 250 g of water, 491.8 g of styrene, and 107.9 g of butyl methacrylate was prepared. A portion of the emulsion (43.9 g) was transferred to the flask. Next, 20.1 g of 33% concentration ammonium persulfate in water was poured into the flask. After the initiation of polymerization and the initial exotherm, 67 g of n-dodecylmercaptan was added to the emulsion. Through a span of 3.0 hr, the emulsion was gradually dispensed into the flask. At the outset, the rate of addition of the emulsion into the flask was 2.65 grams/minute (g/min) for the first 10 minutes (min). The rate of addition of the emulsion into the flask was then raised to 5.3 g/min for the remainder of the feed time (3 hr). From the outset of the emulsion feed, 111.2 g of an ammonium peroxodisulfate solution at 6% strength in water were added at a constant rate over 3.0 hr, and the reaction medium was kept at 85-87° C.

After the completion of the feeds and at roughly 80° C., a solution of 1.0 g erythrobic acid and 18.1 g water, and, at the same time, 20.9 g of a 9.4% concentration solution of tert-butyl hydroperoxide were dispensed into the flask during a span of 30 min. A copolymer dispersion of polymeric tackifier additive was produced.

The emulsion compositions described in Table III were prepared using the above described general procedure.

Molecular Weight Measurements

For the measurement of Mn and weight average molecular weight (Mw), tackifier polymeric additives shown in Table III were prepared in tetrahydrofuran (THF) (High Performance Liquid Chromatography (HPLC) grade from Fisher) at concentration of about 2 milligrams per gram (mg/g). Samples were left to equilibrate on a mechanical shaker overnight at ambient temperature (about 25° C.). Sample solutions were filtered using 0.45 microns (μm) polytetrafluoroethylene (PTFE) filters prior to subjecting the sample solutions to an SEC (size exclusion chromatography) method.

SEC Separation Set-Up

SEC separations were carried out on a liquid chromatograph consisting of an Agilent 1100 Model isocratic pump, vacuum degasser, variable injection size autosampler, and Agilent 1100 HPLC G1362A Refractive Index detector. Agilent ChemStation, version B.04.03 with Agilent GPC-Addon version B.01.01 were used to process the data.

SEC separations were performed in THF (HPLC grade from Fisher) at 1 milliliter/minute (mL/min) using a SEC column set composed of two PLgel MIXED-D columns (available from Agilent) in neat THF with narrow-fraction polystyrene standards from 580 Daltons to 371,000 Daltons fitted with 1st order fit calibration curve. 100 microliters (μL) of sample were subjected to SEC separation.

SEC Separation Conditions

Columns: PLgel MIXED-D columns (300×7.5 millimeters (mm) internal diameter (ID)) plus guard (50 mm×7.5 mm ID), particle size 5 μm
Eluent: THF (HPLC grade Fisher)
Flow rate: 1.0 mL/min
Sample solvent: THF
Sample concentration: ~2 mg/g (0.2%)
Injected volume of sample solution: 100 μL
Calibration: Narrow-fraction polystyrene standards having peak molecular weight in the range from 580 Daltons to 371,000 Daltons with a concentration of about 0.5 milligrams per milliliter (mg/mL) in THF were used to construct a 10-point calibration curve (1st order fit) which was used to evaluate the relative molecular weight of analyzed sample.
Detection: refractive index (RI)

The Tg for the polymeric tackifier additives described in Table III was measured using a TA Instruments Differential Scanning calorimeter (DSC) according to the following method steps:
1. Ramp 20° C./min to 150° C.
2. Isothermal for 5 min.
3. Equilibrate at −90° C.
4. Modulate+/−1.00° C. every 40 seconds.
5. Isothermal for 5 min.
6. Ramp 3.00° C./min to 150° C.

TABLE III

Compositions

| Example | Composition | Mn (Da) | Mw (Da) | Tg (° C.) | Generic Polymer Miscibility Score* | Film Clarity |
|---|---|---|---|---|---|---|
| Comp. Ex. A | 606.4 g Sty/3.3 g MAA/60.3 g nDDM | 2,400 | 5,420 | 50 | −0.32 | Poor |
| Comp. Ex. B | 426.8 g Sty/172.9 BMA/3.3 g MAA/67 g nDDM | 1,848 | 4,203 | −3.5 | 0.15 | Very Good |
| Inv. Ex. 1 | 491.8 g Sty/107.9 g BMA/3.3 g MAA/67 g nDDM | 1,914 | 4,284 | 23.5 | 0.03 | Good |
| Comp. Ex. C | 450.9 g Sty/182.2 g BMA/3.3 g MAA/33.5 g nDDM | 3,738 | 6,445 | 41.2 | −0.09 | Poor |
| Inv. Ex. 2 | 220.4 g Sty/412.7 g BMA/3.3 g MAA33.5 g nDDM | 3,852 | 6,367 | 15.2 | 0.17 | Good |
| Inv. Ex. 3 | 158.1 g Sty/158.1 g MMA/316.2 g BMA/3.3 g MAA/33.5 g nDDM | ~3,800 | ~6,400 | 21.3 | 0.19 | Very Good |
| Inv. Ex. 4 | 110.6 g Sty/110.6 g MMA/412.1 g BMA/3.3 g MAA/33.5 g nDDM | ~3,800 | ~6,400 | 20.1 | 0.21 | Good |

*Calculated based on adhesive polymer HSP of $\delta_{D2}$ = 15.2, $\delta_{P2}$ = 5.4, and $\delta_{H2}$ = 4.2

The additives of the Comp. Ex. described in Table III have a Tg lower than 0° C. or a miscibility (compatibility) scores lower than 0.

Examples 5-8 and Comparative Examples D-F—Pressure-Sensitive Adhesive Polymers

The polymeric tackifier additives described in Table III were blended with a butyl acrylate-based pressure-sensitive adhesive polymer (BA-PSA) at a solids loading of 25 parts of additive to 100 parts of adhesive solid to prepare pressure-sensitive adhesive polymers.

TABLE IV

Pressure Sensitive Adhesive Polymers and Films

| Example | Composition | Polymer Miscibility Score | Film Made With Adhesive |
|---|---|---|---|
| Comp. Ex. D | 25 Comp. Ex. A: 100 BA-PSA | −0.30 | Comp. Ex. G |
| Comp. Ex. E | 25 Comp. Ex. B: 100 BA-PSA | 0.18 | Comp. Ex. H |
| Inv. Ex. 5 | 25 Inv. Ex. 1: 100 BA-PSA | 0.06 | Inv. Ex. 9 |
| Comp. Ex. F | 25 Comp. Ex. C: 100 BA-PSA | −0.06 | Comp. Ex. I |
| Inv. Ex. 6 | 25 Inv. Ex. 2: 100 BA-PSA | 0.21 | Inv. Ex. 10 |
| Inv. Ex. 7 | 25 Inv. Ex. 3: 100 BA-PSA | 0.23 | Inv. Ex. 11 |
| Inv. Ex. 8 | 25 Inv. Ex. 4: 100 BA-PSA | 0.26 | Inv. Ex. 12 |

Examples 9-12 and Comparative Examples G-I—Films Made With Adhesives

The pressure-sensitive adhesive polymers of Inv. Ex. 5-8 and Comp. Ex. D-F were used to prepare adhesive films by applying the wet adhesive on a silicone coated release paper and then drying the adhesive at 80° C. for 5 min. The dried adhesive was then transferred to a 2 mil PET film for adhesive testing.

Test Results

The above blends of additives and the butyl acrylate adhesive polymer were tested for pressure sensitive adhesive (PSA) properties (in accordance with PSTC 101 (peel adhesion testing) PSTC-16 (loop tack testing) and PSTC 107 (shear testing) methods) on a stainless steel substrate and on a high density polyethylene (HPDE) substrate. The results of the PSA tests are described in Table V. Comp. Ex. G was not tested due to poor compatibility (i.e., poor film clarity). Comp. Ex. I also had poor film clarity and the results with the EHA-based adhesive were poor.

TABLE V

Test Results

| Test | Unit | Adhesive no additive | Comp. Ex. H | Inv. Ex. 9 | Comp. Ex. I | Inv. Ex. 10 | Inv. Ex. 11 | Inv. Ex. 12 |
|---|---|---|---|---|---|---|---|---|
| Test on Stainless Steel (SS) | | | | | | | | |
| 180° Peel adhesion, 20 min | N/(2.54 cm) | 2.8 | 6.7 | 9.4 | 11.4 | 10.7 | 11.8 | 9.2 |
| 180° Peel adhesion, 24 hr | N/(2.54 cm) | 6.3 | 7.8 | 10.0 | 13.5 | 12.1 | 13.4 | 13.1 |
| Loop tack | N/(2.54 cm) | 4.3 | 5.8 | 5.7 | 6.1 | 6.5 | 5.6 | 6.3 |
| Shear 2.54 cm × 2.54 cm/1 Kg | Hours | >140 | 70 | >140 | >140 | 78 | >140 | >140 |
| Test on HDPE | | | | | | | | |
| 180° Peel adhesion, 20 min | N/(2.54 cm) | 2.3 | 3.6 | 3.5 | 6.2 | 7.6 | 8.8 | 8.1 |
| 180° Peel adhesion, 24 hr | N/(2.54 cm) | 2.2 | 6.5 | 7.9 | 7.3 | 10.4 | 10.4 | 9.7 |
| Loop tack | N/(2.54 cm) | 3.7 | 5.9 | 4.4 | 4.1 | 4.9 | 4.8 | 4.0 |

The Inventive Examples provide enhancements in adhesion such that the peel results for the Inventive Examples exceed those of the adhesive with no additive without decreasing the shear resistance below 72 hr. In Comp. Ex. H the shear resistance is decreased to 70 hr.

Examples 13-16 and Comparative Examples J-L—Pressure-Sensitive Adhesive Polymers The polymeric tackifier additives described in Table III were also blended with a 2-ethylhexyl acrylate-based pressure-sensitive adhesive polymer at a solids loading of 25 parts of additive to 100 parts of adhesive solid to prepare pressure-sensitive adhesive polymers as described in Table VI.

TABLE VI

Pressure Sensitive Adhesive Polymers and Films

| Example | Composition | Polymer Miscibility Score | Film Made With Adhesive | Film Clarity |
|---|---|---|---|---|
| Comp. Ex. J | 25 Comp. Ex. A: 100 EHA-PSA | −0.33 | Comp. Ex. M | Poor |
| Comp. Ex. K | 25 Comp. Ex. B: 100 EHA-PSA | 0.15 | Comp. Ex. N | Very Good |
| Inv. Ex. 13 | 25 Inv. Ex. 1: 100 EHA-PSA | 0.02 | Inv. Ex. 17 | Good |
| Comp. Ex. L | 25 Comp. Ex. C: 100 EHA-PSA | −0.09 | Comp. Ex. O | Poor |
| Inv. Ex. 14 | 25 Inv. Ex. 2: 100 EHA-PSA | 0.18 | Inv. Ex. 18 | Good |
| Inv. Ex. 15 | 25 Inv. Ex. 3: 100 EHA-PSA | 0.20 | Inv. Ex. 19 | Very Good |
| Inv. Ex. 16 | 25 Inv. Ex. 4: 100 EHA-PSA | 0.23 | Inv. Ex. 20 | Good |

Examples 17-20 and Comparative Examples M-O—Films Made With Adhesives

The pressure-sensitive adhesive polymers of Inv. Ex. 13-16 and Comp. Ex. J-L were used to prepare adhesive films by applying the wet adhesive on a silicone coated release paper and then drying the adhesive at 80° C. for 5 min. The dried adhesive was then transferred to a 2 mil PET film for adhesive testing.

The clarity of resultant films of the blend was assessed qualitatively as an indication of the compatibility of the additive with the acrylic adhesive polymer. The film clarity was determined by visual inspection of the film. The Comparative Examples of the films using the Comparative Example additives with miscibility scores lower than 0 had a "poor" film clarity, whereas the Inventive Examples of the films using the Inventive Example additives with miscibility scores>0 had a "good" film clarity to a "very good" film clarity as determined by visual observation.

The blends were then tested for PSA properties on stainless steel and HPDE substrates. The results of the PSA tests are described in Table VII. Comp. Ex. J was not tested due to poor compatibility (i.e., poor film clarity).

TABLE VII

Test Results

| Test | Unit | Adhesive no additive | Comp. Ex. N | Inv. Ex. 17 | Comp. Ex. O | Inv. Ex. 18 | Inv. Ex. 19 | Inv. Ex. 20 |
|---|---|---|---|---|---|---|---|---|
| Test on Stainless Steel | | | | | | | | |
| 180° Peel adhesion, 20 min | N/(2.54 cm) | 6.0 | 5.6 | 6.1 | 3.8 | 7.2 | 5.6 | 5.7 |
| 180° Peel adhesion, 24 hr | N/(2.54 cm) | 9.6 | 9.2 | 11.5 | 11.2 | 15.2 | 11.4 | 12.1 |
| Loop tack | N/(2.54 cm) | 7.2 | 5.0 | 4.1 | 3.7 | 5.3 | 3.1 | 2.7 |
| Shear 2.54 cm × 2.54 cm/1 Kg | Hours | >140 | 138 | >140 | >140 | 73 | >140 | >140 |
| Test on HDPE | | | | | | | | |
| 180° Peel adhesion, 20 min | N/(2.54 cm) | 4.6 | 5.4 | 6.3 | 3.9 | 6.6 | 6.2 | 4.3 |
| 180° Peel adhesion, 24 hr | N/(2.54 cm) | 6.4 | 6.1 | 8.2 | 7.4 | 10.2 | 11.5 | 9.8 |
| Loop tack | N/(2.54 cm) | 4.8 | 3.7 | 3.7 | 2.2 | 4.3 | 1.3 | 2.5 |

The Inv. Ex. provide enhancements in adhesion such that the peel of the peel results for the Inv. Ex. are in most cases higher than those of the adhesive with no additive and in all cases are >90% of those of the adhesive with no additive without decreasing the shear resistance below 72 hr. On the contrary, the 20 min peel results for Comp. Ex. N are less than 90% of those of the adhesive with no additive.

Other Embodiments

The tackifier polymeric additive of the present invention includes an emulsion polymerization reaction product of: (a) at least one monomer with a homopolymer glass transition temperature of >80° C. in one embodiment and from 0° C. to 60° C. in another embodiment such as a monomer selected from the group consisting of aromatic monomers, methyl methacrylate, and mixtures thereof; (b) at least one acrylate or methacrylate monomer; and (c) at least one chain transfer agent; wherein the tackifier polymeric additive has a polymer miscibility score (which is a generic calculation of the score which is not specific to a given adhesive blend) of >0 in one embodiment and from >0 to 3 in another embodiment.

In one embodiment, the monomer with a homopolymer glass transition temperature of >80° C. of the tackifier polymeric additive can be selected from the group consisting of styrene, methyl methacrylate, alpha-methyl styrene, and mixtures thereof.

In another embodiment, the at least one chain transfer agent of the tackifier polymeric additive can be selected from the group consisting of t-dodecyl mercaptan; n-dodecyl mercaptan; 3-mercaptopropionic acid; methyl 3-mercaptopropionate; butyl 3-mercapto-propionate; isopropanol; isobutanol; lauryl alcohol; t-octyl alcohol; carbon tetrachloride; tetrachloroethylene; trichloro-bromoethane; and mixtures thereof.

In still another embodiment, the tackifier polymeric additive of the present invention can have a glass transition temperature of the tackifier polymeric additive is >0° C.; a number average molecular weight of from 1,200 Da to 20,000 Da in one embodiment and from 1,500 Da to 10,000 Da in another embodiment; and the polymer miscibility score of the tackifier polymeric additive is >0.

What is claimed is:

1. A tackifier polymeric additive comprising an emulsion polymerization reaction product of:
    (a) at least one monomer with a homopolymer glass transition temperature of greater than 80° C., wherein component (a) is styrene;
    (b-1) two acrylate or methacrylate monomers that are n-butyl methacrylate, and methacrylic acid;
    (b-2) optionally, methyl methacrylate; and
    (c) at least one chain transfer agent
    wherein
    (i) the tackifier polymeric additive has a polymer miscibility score of greater than 0; and
    (ii) the glass transition temperature of the tackifier polymeric additive is from 15° C. to 40° C.

2. The tackifier polymeric additive of claim 1, wherein the number average molecular weight of the tackifier polymeric additive is from 1,200 Daltons to 20,000 Daltons.

3. The tackifier polymeric additive of claim 1, wherein the at least one chain transfer agent is selected from the group consisting of alkyl mercaptans; esters of mercaptans; alcohols; and mixtures thereof.

4. The tackifier polymeric additive of claim 1 wherein the tackifier polymeric additive consists of styrene, n-butyl methacrylate, methacrylic acid, and n-dodecylmercaptan.

5. The tackifier polymeric additive of claim 1 wherein the tackifier polymeric additive consists of styrene, n-butyl methacrylate, methacrylic acid, methyl methacrylate, and n-dodecylmercaptan.

6. A tackified acrylic adhesive composition comprising:
    (I) at least one acrylic adhesive polymer that is butyl acrylate based pressure sensitive polymer;
    (II) at least one tackifier polymeric additive of claim 1; and
    (III) optionally, water.

7. The tackified acrylic adhesive composition of claim 6, wherein the peel adhesion of the tackified acrylic adhesive composition is from 90 percent to 1,000 percent relative to the untackified adhesive without a decrease in cohesion (shear resistance) relative to the untackified adhesive; and wherein the cohesion (shear resistance) of the tackified acrylic adhesive composition is greater than 71 hours.

8. The tackified acrylic adhesive composition of claim 6 comprising a solids loading of 25 parts of the tackifier polymeric additive (II) to 100 parts of the acrylic adhesive polymer (I).

9. A process for making a tackified acrylic adhesive composition comprising admixing:
    (I) at least one acrylic adhesive polymer that is butyl acrylate based pressure sensitive polymer; and
    (II) at least one tackifier polymeric additive of claim 1.

10. An article comprising the tackified acrylic adhesive composition of claim 6.

11. A process for making tackifier polymeric additive comprising:
    admixing
    (a) at least one aromatic monomer with a homopolymer glass transition temperature greater than 80° C., wherein component (a) is styrene;
    (b-1) two acrylate or methacrylate monomers that are n-butyl methacrylate, and methacrylic acid, and
    (b-2) optionally, methyl methacrylate; and
    (c) at least one chain transfer agent; and
    forming a tackifier polymeric additive having
    (i) a polymer miscibility score of greater than 0; and
    (ii) a glass transition temperature from 15° C. to 40° C.

12. The process of claim 11, wherein the admixing is carried out by emulsion polymerization.

* * * * *